(12) United States Patent
Narendran et al.

(10) Patent No.: US 9,746,142 B2
(45) Date of Patent: Aug. 29, 2017

(54) SCATTERED-PHOTON EXTRACTION-BASED FIXTURES

(71) Applicant: RENSSELAER POLYTECHNIC INSTITUTE, Troy, NY (US)

(72) Inventors: Nadarajah Narendran, Clifton Park, NY (US); Yimin Gu, Milpitas, CA (US); Jean Paul Freyssinier, Troy, NY (US); Yiting Zhu, Troy, NY (US)

(73) Assignee: RENSSELAER POLYTECHNIC INSTITUTE, Troy, NY (US)

( * ) Notice: Subject to any disclaimer, the term of this patent is extended or adjusted under 35 U.S.C. 154(b) by 0 days.

(21) Appl. No.: 14/793,071

(22) Filed: Jul. 7, 2015

(65) Prior Publication Data
US 2015/0308638 A1     Oct. 29, 2015

Related U.S. Application Data

(63) Continuation of application No. 14/152,172, filed on Jan. 10, 2014, now Pat. No. 9,103,534, which is a
(Continued)

(51) Int. Cl.
*F21K 99/00* (2016.01)
*F21V 7/00* (2006.01)
(Continued)

(52) U.S. Cl.
CPC ............... *F21K 9/56* (2013.01); *F21K 9/64* (2016.08); *F21S 8/033* (2013.01); *F21S 8/06* (2013.01);
(Continued)

(58) Field of Classification Search
CPC ............ F21K 9/56; F21V 29/70; F21S 8/033
See application file for complete search history.

(56) References Cited

U.S. PATENT DOCUMENTS 3,875,456 A      4/1975   Kano et al.
6,809,342 B2 *  10/2004  Harada ................. H01L 33/44
                                                              257/79
(Continued)

FOREIGN PATENT DOCUMENTS

JP     2006210949 A      8/2006
JP     2007-563743 A    12/2007
(Continued)

OTHER PUBLICATIONS

International Search Report for PCT Application No. PCT/US2011/028069 mailed Oct. 28, 2011.
(Continued)

*Primary Examiner* — Elmito Breval
(74) *Attorney, Agent, or Firm* — Muncy, Geissler, Olds & Lowe, P.C.

(57) ABSTRACT

A light fixture includes a light source, a wavelength-conversion material, and a reflector. The light source is configured to emit a first radiation, and has a front surface and a back surface. The wavelength-conversion material is arranged under the front surface and configured to convert the first radiation to a second radiation which has a first portion not able to reach the reflector and a second portion able to reach the reflector. The reflector is arranged over the back surface and configured to reflect the second portion away from the light source without passing through the wavelength-conversion material. The reflector has an end distant from the light source and is arranged in an elevation different from that of the wavelength-conversion material.

13 Claims, 10 Drawing Sheets

Related U.S. Application Data continuation of application No. 13/581,861, filed as application No. PCT/US2011/028069 on Mar. 11, 2011, now Pat. No. 8,646,927, which is a continuation of application No. 12/947,899, filed on Nov. 17, 2010, now Pat. No. 8,764,225, which is a continuation of application No. 11/642,089, filed on Dec. 20, 2006, now Pat. No. 7,837,348, which is a continuation-in-part of application No. 10/583,105, filed as application No. PCT/US2005/015736 on May 5, 2005, now Pat. No. 7,819,549.

(60) Provisional application No. 60/568,373, filed on May 5, 2004, provisional application No. 60/636,123, filed on Dec. 15, 2004, provisional application No. 61/339,958, filed on Mar. 11, 2010.

(51) Int. Cl.

| | |
|---|---|
| *F21S 8/06* | (2006.01) |
| *F21V 9/16* | (2006.01) |
| *F21V 9/00* | (2015.01) |
| *F21V 13/08* | (2006.01) |
| *F21V 29/70* | (2015.01) |
| *F21V 29/74* | (2015.01) |
| *F21S 8/00* | (2006.01) |
| *F21K 9/64* | (2016.01) |
| *B82Y 20/00* | (2011.01) |
| *F21V 29/87* | (2015.01) |
| *F21V 29/89* | (2015.01) |
| *F21Y 103/10* | (2016.01) |
| *F21Y 115/10* | (2016.01) |

(52) U.S. Cl.
CPC .............. *F21V 7/0016* (2013.01); *F21V 9/00* (2013.01); *F21V 9/16* (2013.01); *F21V 13/08* (2013.01); *F21V 29/70* (2015.01); *F21V 29/74* (2015.01); *B82Y 20/00* (2013.01); *F21V 7/0033* (2013.01); *F21V 29/87* (2015.01); *F21V 29/89* (2015.01); *F21Y 2103/10* (2016.08); *F21Y 2115/10* (2016.08)

(56) References Cited

U.S. PATENT DOCUMENTS

| | | |
|---|---|---|
| 8,113,680 B2 | 2/2012 | O'Brien et al. |
| 8,376,580 B2 | 2/2013 | Li |
| 8,415,696 B2 | 4/2013 | Park |
| 8,430,527 B2 | 4/2013 | Lai |
| 2002/0047516 A1 | 4/2002 | Iwasa et al. |
| 2006/0124953 A1* | 6/2006 | Negley .................. H01L 33/486 257/99 |
| 2008/0030993 A1 | 2/2008 | Narendran et al. |
| 2008/0094829 A1 | 4/2008 | Narendran et al. |
| 2009/0250714 A1 | 10/2009 | Yun et al. |
| 2009/0316383 A1 | 12/2009 | Son et al. |
| 2010/0128463 A1 | 5/2010 | Kim et al. |

FOREIGN PATENT DOCUMENTS

| | | |
|---|---|---|
| JP | 2010-525510 A | 7/2010 |
| WO | 2005107420 | 11/2005 |
| WO | 2008027093 | 3/2008 |
| WO | 2009024952 A2 | 2/2009 |

OTHER PUBLICATIONS

Notification of First Office Action issued in Chinese Patent Application No. 201180013506.0 dated Jul. 3, 2014.
Japanese IPO Office Action issued in Japanese Patent Application No. 2012-557274 dated Nov. 4, 2014.
Notice of Reasons for Rejection issued in Japanese Patent Application No. 2015-212875 mailed Sep. 27, 2016 (10 pages).
Supplementary European Search Report for Application No. EP 11 75 4147, dated Nov. 28, 2016, 10 pages.
Supplementary European Search Report for Application No. EP 11 75 4147, dated Mar. 7, 2017, 16 pages.

* cited by examiner

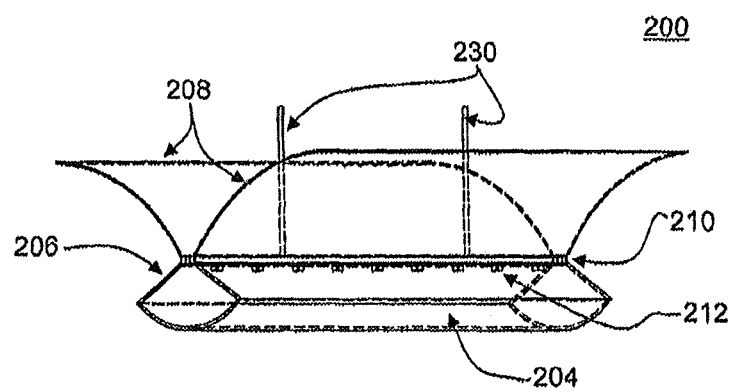
FIG. 2(a)
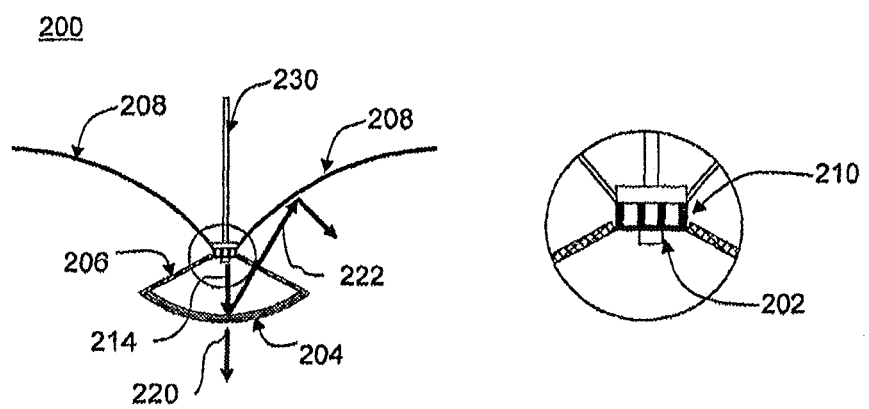
FIG. 2(b)  FIG. 2(c)

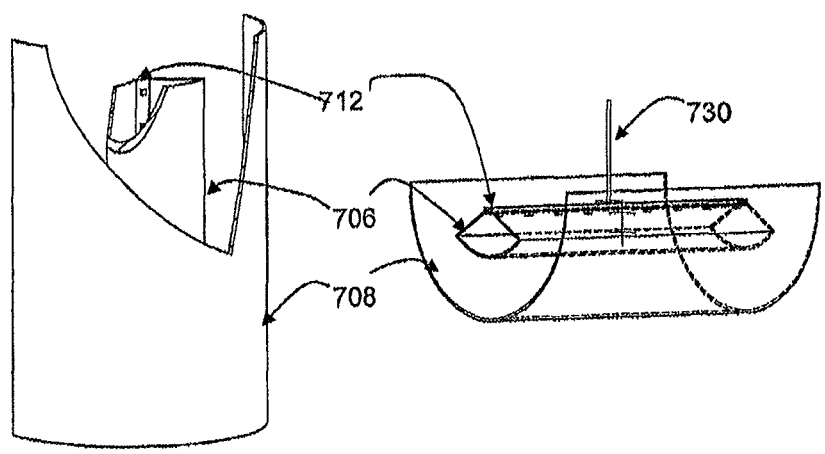
FIG. 7(a)  FIG. 7(b)
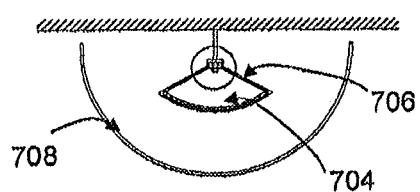 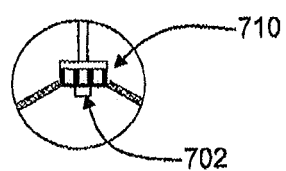
FIG. 7(c)  FIG. 7(d)

SCATTERED-PHOTON EXTRACTION-BASED FIXTURES

CROSS-REFERENCE TO RELATED APPLICATIONS

This application is a continuation of U.S. patent application Ser. No. 14/152,172, filed Jan. 10, 2014 which is a continuation of U.S. patent application Ser. No. 13/581,861, filed Nov. 6, 2012 (now U.S. Pat. No. 8,646,927), which is the U.S. National Phase application of PCT/US2011/028069, filed Mar. 11, 2011 which is a continuation of U.S. application Ser. No. 12/947,899, filed Nov. 17, 2010 (now U.S. Pat. No. 8,764,225), which is a continuation of U.S. application Ser. No. 11/642,089, filed Dec. 20, 2006 (now U.S. Pat. No. 7,837,348) which is a continuation-in-part application of U.S. application Ser. No. 10/583,105, filed Apr. 23, 2007 (now U.S. Pat. No. 7,819,549), entitled "High Efficiency Light Source Using Solid-State Emitter And Down-Conversion Material," which is the 371 National Phase of International Application No. PCT/US2005/015736, filed May 5, 2005, which claims the benefit of priority to U.S. Provisional Application Ser. No. 60/568,373, filed May 5, 2004 and to U.S. Provisional Application Ser. No. 60/636,123, filed Dec. 15, 2004. This application also claims priority to U.S. Provisional Application Ser. No. 61/339,958, filed Mar. 11, 2010. The disclosures of all of these applications are incorporated in their entirety by reference herein.

FIELD OF THE INVENTION

The present invention relates generally to solid-state lighting. Specifically, the present invention relates to highly efficient lighting fixtures using solid-state light (SSL) sources, optic elements, heat sinks, and a remote wavelength-converting material.

BACKGROUND OF THE INVENTION

Solid-state light (SSL) emitting devices, including solid-state light fixtures having light emitting diodes (LEDs) are extremely useful, because they potentially offer lower fabrication costs and long term durability benefits over conventional light fixtures, such as those that utilize incandescent and fluorescent lamps. Due to their long operation (burn) time and low power consumption, solid-state light emitting devices frequently provide a functional cost benefit, even when their initial cost is greater than that of conventional lamps. Because large scale semiconductor manufacturing techniques may be used, many solid-state light fixtures may be produced at extremely low cost.

In addition to applications such as indicator lights on home and consumer appliances, audio visual equipment, telecommunication devices and automotive instrument markings, LEDs have found considerable application in indoor and outdoor informational displays. For example, LEDs may be incorporated into overhead or wall-mounted lighting fixtures, and may be designed for aesthetic appeal.

With the development of efficient LEDs that emit blue or ultraviolet (UV) light, it has become feasible to produce LEDs that generate white light through wavelength conversion of a portion of the primary emission of the LED to longer wavelengths. Conversion of primary emissions of the LED to longer wavelengths is commonly referred to as down-conversion of the primary emission. This system for producing white light by combining an unconverted portion of the primary emission with the light of longer wavelength is well known in the art. Other options to create white light with LEDs include mixing two or more colored LEDs in different proportions. For example, it is well known in the art that mixing red, green and blue (RGB) LEDs produces white light. Similarly, mixing RBG and amber (RGBA) LEDs, or RGB and white (RGBW) LEDs, are known to produce white light.

Recent studies have determined that the heat generated from LEDs decreases overall light emission and bulb durability. More particularly, the LED device becomes less efficient when heated to a temperature greater than 100° C., resulting in a declining return in the visible spectrum. Extended operation, and the resulting exposure to high heat, also reduces the effective life of the LEDs. Additionally, the intrinsic wavelength-conversion efficiency for some down conversion phosphors also drops dramatically as the temperature increases above approximately 90° C. threshold.

The amount of light emission directed into the particular environment may be increased by the use of reflective surfaces, which is also well known in the art. Reflective surfaces have been used to direct light from the LED to the wavelength-conversion material and/or to reflect down converted light which is generated from the wavelength-conversion material. Even with these improvements, the current state of the art LED technology is inefficient in the visible spectrum. The light output for a single LED is below that of traditional light fixtures such as those which utilize incandescent lamps, which are approximately 10 percent efficient in the visible spectrum. To achieve comparable light output power density to current light fixture technology utilizing incandescent lamps, an LED device often requires a larger LED or a design having multiple LEDs. However, designs incorporating a larger LED or multiple LEDs have been found to present their own challenges, such as heat generation and energy utilization.

SUMMARY OF INVENTION

To meet this and other needs, and in view of its purpose, the present invention provides a scattered photon extraction light fixture including an optic element having a first surface and at least one substantially transparent sidewall extending from the first surface; a light source for emitting short wavelength radiation, the light source disposed at an end of the at least one substantially transparent sidewall opposite the first surface of the optic element; a wavelength-conversion material, disposed on the first surface of the optic element, for receiving and down converting at least some of the short wavelength radiation emitted by the light source and back transferring a portion of the received and down converted radiation; and one or more reflectors positioned opposite the wavelength-conversion material, such that the light source is positioned between the wavelength-conversion material and the reflectors, for reflecting at least some of the radiation extracted from the optic element through the at least one substantially transparent sidewall; wherein the at least one substantially transparent sidewall is connected at one end to the first surface containing the wavelength-conversion material and at another end to the light source, and wherein the substantially transparent sidewall is configured to pass radiation back-transferred from the wavelength-conversion material outside of the light emitting apparatus.

The light fixture may further include a wavelength-converting material disposed on at least one or more other walls, such as one or more transparent sidewalls, of the optic element. Similarly, the light fixture may further include a heat sink affixed or adjacent to the light source. In some embodiments, the heat sink may be affixed on one side to at least one substantially transparent sidewall and on another side to one or more reflectors. The light fixtures of the present invention may be, for example, extruded or revolved light emitting fixtures. The light fixtures may also include one or more suspension mechanisms for installation, for example, to a wall, as in a wall-mounted light fixture, or to a ceiling, as in a suspended light fixture. The light source may be at least one semiconductor light emitting diode, such as a light emitting diode (LED), a laser diode (LD), or a resonant cavity light emitting diode (RCLED). Additionally or alternatively, the light source may be an array of more than one light emitters, such as an array of LEDs. A number of different types of LEDs may be employed as the light source. For example, when an array is used as the light source, the array may include one or more LEDs of the same or of different types. The light sources may be selected to improve energy efficiency, control the color qualities of the emitted light, or for a number of other reasons, such as aesthetics. The wavelength-converting material may be include one or more materials, such as phosphors, quantum dots, quantum dot crystals, and quantum dot nano crystals, and mixtures thereof.

In another embodiment, the present invention provides an extruded scattered photon extraction light fixture including a light source for emitting short wavelength radiation, the light source comprising one or more light emitters; an elongated tube optic element having at least one substantially transparent surface; a wavelength-conversion material, disposed on or integrated with at least one surface of the optic element and remote from the light source, for receiving and down converting at least some of the short wavelength radiation emitted by the light source and back transferring a portion of the received and down converted radiation; and one or more reflectors positioned opposite the wavelength-conversion material, such that the light source is positioned between the wavelength-conversion material and the reflectors, for reflecting at least some of back transferred portion of the received and down converted radiation; wherein the light fixture is configured such that some radiation may be reflected back towards the light source as unconverted light radiation, some light may be transferred through the wavelength-conversion material without being converted, and some radiation is converted and may be forward transferred or back transferred by the wavelength-conversion material; and wherein the light fixture is configured to capture substantially all of the forward transferred and the back transferred converted light by the arrangement of the light source, optic elements, and reflectors.

In yet another embodiment, the present invention provides a scattered photon extraction light fixture including a light source for emitting short wavelength radiation, the light source comprising one or more light emitters, affixed to a first optic element; a wavelength-conversion material, disposed on or integrated with a second optic element, for receiving and down converting at least some of the short wavelength radiation emitted by the light source and back transferring a portion of the received and down converted radiation; and a reflective surface affixed at one side to the first optic element to form a reflective enclosure containing therein the second optic element and the wavelength-conversion material, for reflecting at least some of back transferred portion of the received and down converted radiation; wherein the second optic element and wavelength-conversion material are suspended within the reflective surface and remote from the light source.

In still another embodiment, the present invention provides a scattered photon extraction light system including a plurality of light emitting fixtures. Each of the plurality of light emitting fixtures includes an optic element having a first surface and at least one substantially transparent sidewall extending from the first surface; a light source for emitting short wavelength radiation, the light source disposed at an end of the at least one substantially transparent sidewall opposite the first surface of the optic element; a wavelength-conversion material, disposed on the first surface of the optic element, for receiving and down converting at least some of the short wavelength radiation emitted by the light source and back transferring a portion of the received and down converted radiation; and one or more reflectors positioned opposite the wavelength-conversion material, such that the light source is positioned between the wavelength-conversion material and the reflectors, for reflecting at least some of the radiation extracted from the optic element through the at least one substantially transparent sidewall; wherein the at least one substantially transparent sidewall is connected at one end to the first surface containing the wavelength-conversion material and at another end to the light source, and wherein the substantially transparent sidewall is configured to pass radiation back-transferred from the wavelength-conversion material outside of the light emitting fixture.

In a further embodiment, the present invention provides a scattered photon extraction light fixture including an optic element having a first surface with two opposite edges and one or more secondary surfaces, wherein the one or more secondary surfaces are tangentially or perpendicularly connected at each edge of the first surface; one or more light emitters for emitting short wavelength radiation, the one or more light emitters disposed on the one or more secondary surfaces of the optic element; a wavelength-conversion material, disposed on the first surface of the optic element, for receiving and down converting at least some of the short wavelength radiation emitted by the emitters and forward transferring a portion of the received and down converted radiation; and one or more reflectors positioned opposite the one or more light emitters, such that the wavelength-conversion material is positioned between the one or more light emitters and the reflectors, for reflecting at least some of the forward transferred radiation through the optic element; wherein the one or more secondary surfaces are each connected at one end to the first surface containing the wavelength-conversion material and at another end to the one or more reflectors, and wherein the one or more secondary surfaces are configured to pass radiation back-transferred from the wavelength-conversion material outside of the light emitting fixture.

The wavelength-conversion material, in the embodiments of the present invention, is disposed remotely, i.e., away from the light source(s). One or more wavelength-converting materials are used to absorb radiation in one spectral region and emit radiation in another spectral region, and the wavelength-converting material can be either a down-converting or an up-converting material. Multiple wavelength-converting materials are capable of converting the wavelength emitted from the light source to the same or different spectral regions. The wavelength-conversion materials may be mixed together or employed as individual layers. By capturing both the forward transferred portion and the back transferred portion of the down-converted light, system efficiency may be improved. Similarly, the position of the down-conversion material and the reflector, when one or more reflectors are utilized, may be adjusted to ensure that light from the light source impinges the down-conversion material uniformly to produce a uniform white light and allowing more of the light to exit the device. Heat sinks may be utilized to reduce and/or redistribute heat at the light source(s). At the same time, positioning the down-conversion material remote from the light source prevents light feedback back into the light source. As a result, the heat at the light source is further minimized and results in improved light output and life. All of these structural parameters and features enable increased light production, enhanced lighting efficiency, and improved energy utilization in comparison to known technologies.

BRIEF DESCRIPTION OF THE DRAWINGS

The invention is best understood from the following detailed description when read in connection with the accompanying drawing. It is emphasized that, according to common practice, the various features of the drawing are not to scale. On the contrary, the dimensions of the various features are arbitrarily expanded or reduced for clarity. Included in the drawing are the following Figures:

FIG. 2(a) is an illustration of a solid-state light source light fixture, in accordance with one embodiment of the present invention;

FIG. 2(b) illustrates a cross-sectional view of the solid-state light source light fixture shown in FIG. 2;

FIG. 2(c) illustrates an expanded view of FIG. 2(b) showing the heat sink and the solid-state light emitting diode (LED);

FIG. 7(a) illustrates a wall-mounted lighting fixture according to an embodiment of the present invention;

FIG. 7(b) illustrates the lighting fixture of FIG. 7(a) configured as a suspension from a ceiling, in accordance with another embodiment of the present invention;

FIG. 7(c) illustrates a cross-sectional view of the lighting fixtures shown in FIGS. 7(a) and 7(b);

FIG. 7(d) illustrates an expanded view of FIG. 7(c) showing the heat sink, optic elements, and the solid-state light emitting diode (LED);

DETAILED DESCRIPTION OF THE INVENTION

Figure 1:
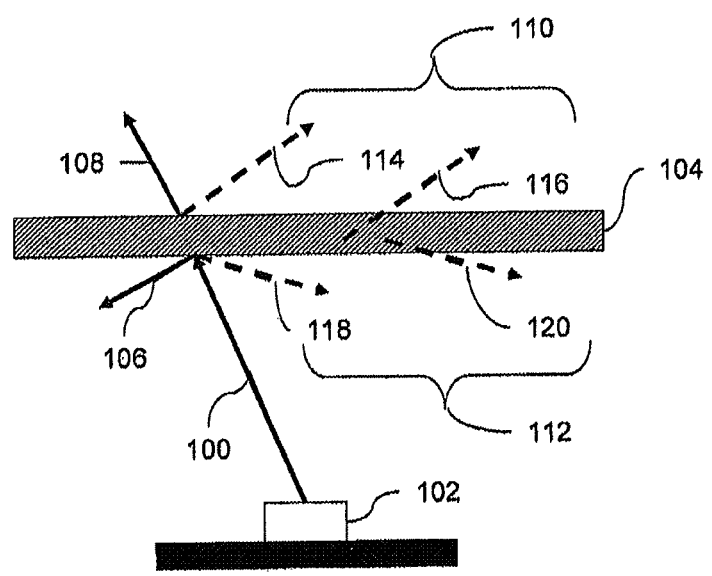
FIG. 1 is an illustration of a method of producing visible light using a solid-state light emitting diode (LED) and a wavelength-converting material according to an exemplary embodiment of the present invention.

Although the invention is illustrated and described herein with reference to specific embodiments, the invention is not intended to be limited to the details shown. Rather, various modifications may be made in the details within the scope and range of equivalents of the claims and without departing from the invention.

In U.S. Pat. No. 7,750,359, the inventors of the present invention have previously discovered the use of wavelength-converting materials to produce a broad bandwidth light having the desired chromaticity value and luminous efficacy while increasing the color rendering index (CRI) and lowering the correlated color temperature (CCT) of the output light, and increasing the efficiency of the device. In International Publication No. WO 2010/144572, the inventors of the present invention discovered and disclosed the benefits obtained by moving the wavelength-converting material to be remote, i.e., away, from the light source. By moving the wavelength-converting material away from the light source, more of the converted light can be extracted and the efficacy of the light device can be improved. Additional benefits were discovered utilizing a heat sink adjacent to, and/or integrated with, the light source. This method of producing light was described as a scattered photon extraction (SPE) technique. The SPE technique was found to increase light production, improve heat dissipation, and result in prolong light device durability and life span. These references, which utilized the SPE technique in an SSL-based lamp bulb as a replacement bulb for incandescent lamps, are incorporated herein by reference in their entirety.

The inventors have now discovered that the SPE technique can be utilized to produce highly efficient lighting fixtures and lighting systems. Existing fixtures which utilize light emitting diode (LED) chips for general lighting applications have been found to have lower luminous output when compared with traditional light sources. To overcome this deficiency, existing LED-based fixtures have utilized arrays of LEDs to achieve the required light level on the target surfaces. Existing methods thus result in increased costs, higher energy consumption, and additional thermal management issues, among other disadvantages. The lighting fixtures of the present invention, which utilize the SPE technique and, optionally, structured optical elements, are able to produce increased light emission using fewer LEDs and less electrical energy. The lighting fixtures of the present invention also potentially reduce manufacturing and operation costs.

The present invention addresses these problems by utilizing the SPE technique, which positions the light source at a point away from the wavelength-converting material. One or more optic elements can be positioned between the light source and the wavelength-converting material. Additionally, heat sinks and reflectors may be utilized in various configurations. The light source may be at least one semiconductor light emitting diode, such as a light emitting diode (LED), a laser diode (LD), or a resonant cavity LED (RCLED). Embodiments of the present invention may utilize a single SSL source, such as a single LED, or may include multiple SSL sources (i.e., a plurality of LEDs in an array) as the light source. As known in the art, a number of different types of LEDs may be employed as the light source. For example, when an array is used as the light source, the array may include one or more LEDs of the same or of different types. The light sources may be selected to improve energy efficiency, control the color qualities of the emitted light, or for a number of other reasons, such as aesthetics. The light source may be coupled to a heat sink, with at least a portion of the heat sink open to the environment to promote the dissipation of heat. The heat sink functions as a heat dissipation element for the light source, enabling heat to be drawn away from the light source. The heat sink may also provide mechanical support to the light source. For example, the heat sink may be substantially affixed to the optic element and coupled to the light source residing within the optic element. This coupling effectively retains the light source within the optic element. The heat sink may additionally be substantially affixed to one or more reflectors. These structural features of the present invention enable the SSL-based lighting fixture to have very high luminous efficacy values and produce light levels similar to, or greater than, traditional lighting fixtures such as fluorescent or incandescent lighting fixtures. The configuration of the present invention, and the utilization of the SPE technique, also prolonging the life span durability of the SSL-based light source.

The use of wavelength-converting materials aids in the production of light that is aesthetically similar to that which is produced by traditional light fixtures, such as those which utilize incandescent A-lamps. As described above, the wavelength-converting material of the present invention may be composed of one or more materials adapted to absorb radiation in one spectral region and emit radiation in another spectral region, and the materials can be either a down-converting or an up-converting material. As such, embodiments of the present invention may incorporate wavelength-converting materials that are down-converting, up-converting, or both. It will be appreciated that the terms "down conversion," "down converting," and "down-converted" refer to materials which are adapted to absorb radiation in one spectral region and emit radiation in another spectral region. Accordingly, the term "down conversion material" is defined as materials that can, through their composition, absorb radiation in one spectral region and emit it in another spectral region.

As light emitted from the light source reaches the wavelength-converting material, the wavelength-converting material absorbs the wavelength light and emits converted light. For example, when the wavelength-converting material includes down-converting material, the down-converting material absorbs short wavelength light and emits down converted light. The emitted down converted light may travel in all directions (known as a Lambertian emitter), and therefore, a portion of the down converted light travels upwards while another portion travels downwards. The light that goes upwards (or outwards) from the down conversion material is the forward transmitted portion of the light and the light that comes downwards towards the light source is the back transmitted portion. This is explained further below with reference to FIG. 1.

The fixtures of the present invention implement the remote wavelength-conversion concept associated with the SPE technique. In a system employing a remote down-conversion material, short wavelength radiant energy from the light source is emitted towards a down-conversion material which is positioned away from the light source. At least a portion of the radiant energy hitting the down-conversion material is down converted to a longer wavelength radiation and, when both radiations mix, results in a white light similar to the light produced by a traditional light fixture. The wavelength-conversion material may be composed of one or more down-converting materials adapted to absorb radiation in one spectral region and emit radiation in another spectral region. The wavelength-conversion materials may be mixed together or employed as individual layers. Multiple wavelength-converting materials are capable of converting the wavelength emitted from the light source to the same or different spectral regions. Accordingly, the wavelength-converting materials may comprise one or more down-converting materials, up-converting materials, or both, which may be selected to produce the desired light output and color rending properties.

FIG. 1 shows a method of producing visible light using a solid-state light emitting diode (LED) 102 and a wavelength-converting material 104, according to an exemplary embodiment of the present invention. As shown, emitted light radiation 100 from LED 102 hits wavelength-converting material 104. Some of the emitted light radiation 100 from the LED 102 is reflected by the wavelength-converting material 104 as back transferred unconverted radiation 106. Another portion of the emitted light radiation 100 from the LED 102 is converted by the wavelength-converting material 104 and emitted rearward as back transferred converted radiation 118. Some of the emitted light radiation 100 from the LED 102 is passed through the wavelength-converting material 104 as forward transferred unconverted radiation 108, while some is passed through as forward transferred converted radiation 114. Furthermore, the wavelength-converting material 104 may emit forward scattered converted radiation 116 and back scattered converted radiation 120. The back scattered converted radiation 120 and back transferred converted radiation 118 are collectively considered back transferred wavelength-converted radiation 112, while the forward scattered converted radiation 116 and the forward transferred converted radiation 114 are collectively considered forward transferred wavelength-converted radiation 110. Use of the SPE technique, which positions the light source remote from the wavelength-converting material, enables improved extraction of the reflected unconverted 106 and transferred unconverted 108 photons, reflected converted 118 and transferred converted 114 photons, and forward scattered converted 116 and back scattered converted 120 radiation converted by the wavelength-converting material 104.

An optic element may occupy the space separating the LED and the wavelength-converting material. In some embodiments, an optic element may be affixed at one end to the LED light source and at another end to the wavelength-converting material. The optic element may take any three-dimensional geometric shape such as, for example, spherical, parabolic, conical, and elliptical. The optic element may also be described as having a cross-sectional shape from the group consisting of circular, triangular, hexagonal, trapezoidal, semicircular, and elliptical, among others. The optic element may be a substantially transparent and light transmissive medium such as, for example, air, glass, or an acrylic. One or more reflectors may be utilized to receive and reflect light emitted by the light source and down-converted by the down-conversion material (i.e., transferred light). The reflector may take any geometric shape such as, for example, spherical, parabolic, conical, and elliptical, and may be comprised of a variety of reflective surfaces known in the art. Additionally, the reflectors may be single units or compound units which include multiple reflective surfaces each having their own geometric shape, transmissiveness, and material composition. For example, the reflectors may be aluminum, plastic with a vaporized aluminum reflective layer, or any other kind of reflective surface. The reflector is positioned to reflect the down-converted light and may be separate from, or adjacent to, the down-conversion material. More than one reflector may be utilized, separately or as part of a compound reflector having multiple geometric configurations, in some embodiments.

In some embodiments of the present invention, the reflector may be an optic element, such as a glass, that has been treated to impart reflective characteristics to the optic element. For example, the reflector may be an optic element upon which a thin film has been deposited or otherwise applied. Such reflectors are known in the art as dichroic filters, thin-film filters, or interference filters, and are often used to selectively pass light of a small range of colors while reflecting other colors. By comparison, dichroic mirrors tend to be characterized by the color(s) of light that they reflect, rather than the color(s) they pass. For simplicity, reflectors treated in this way are referred to collectively herein as "dichroic reflectors" as they may selectively, and concurrently, allow some light to pass while reflecting other light. Such dichroic reflectors may be selective, for example, for particular wave-lengths, heat, light, or for other characteristics of the radiation emitted by the light source, as is known in the art. The reflectors and optic elements of the present invention can have varying degrees of transmissiveness, i.e., they can be chosen to permit or reflect any range of radiation. For example, the optic elements may be entirely translucent and permit all light radiation to pass through. As is known to one having ordinary skill in the art, however, even entirely translucent optic elements may have some de minimis amount of reflective characteristics (e.g., clear glass has been found to reflect about 4% of light radiation) which is thought to be intrinsic of the optic element. Alternatively, the optic element may be entirely reflective and not permit any light radiation to pass through. Additionally, the optic elements and reflectors of the present invention may be prepared such that they have some portions with a particular amount of transmissiveness and other portions that permit or reflect a different amount of light radiation. Accordingly, each optic element or reflector may possess the same level of transmissiveness throughout or have different portions with varying levels of transmissiveness. Any range of transmissiveness of the optic element can be enabled by a number of means known in the art.

In at least one embodiment of the present invention, the wavelength-conversion material is applied to, and contained on, the optic element or reflector using conventional techniques known in the art. In another embodiment, the wavelength-conversion material, such as a down-converting material, is integrated into the optic element or reflector. For example, an acrylic optic element may be fabricated which incorporates down-converting materials, such as phosphors, during the acrylic fabrication process, thereby producing an integrated down-conversion optic element.

As detailed above with regard to FIG. 1, the wavelength-conversion material may transmit, convert, or reflect light radiation. Some light radiation may be reflected back towards the light source as unconverted light radiation. The converted light may be forward transferred or back transferred. Additionally, some light may be transferred through the wavelength-conversion material without being converted (i.e., unconverted transmitted radiation). By capturing both the forward transferred portion and the back transferred portion of the down-converted light, system efficiency is improved. Similarly, the position of the down-conversion material and the reflector, when one or more reflectors are utilized, may be adjusted to ensure that light from the light source impinges the down-conversion material uniformly to produce a uniform white light and allowing more of the light to exit the device. At the same time, positioning the down-conversion material remote from the light source prevents light feedback back into the light source. As a result, the heat at the light source is further minimized and results in improved light output and life. All of these structural parameters and features enable increased light production, enhanced lighting efficiency, and improved energy utilization in comparison to known technologies.

The solid-state light emitting device of the present invention may further include other components that are known in the art. For example, the SSL device may further include an electronic driver. Most SSL sources are low voltage direct current (DC) sources. Therefore an electronic driver is needed to condition the voltage and the current for use in the SSL-based light fixture. Alternatively, there are several alternating current (AC) SSL sources, such as AC-LEDs sold under trade name of "Acriche" by Seoul Semiconductor, Inc. of Seoul, South Korea. In these cases the SSL source (e.g., the LED or LED array) can be directly connected to the AC power available from the grid. Thus embodiments of the present invention may optionally include an electronic driver, at least a portion of which is inside the base of the light fixture, depending on the type of SSL source employed in the SSL-based light fixture. The present invention may further include at least one electronic conductor such as a connection wire. The electronic conductor may be disposed within the optic element to couple electrical current between the light fixture base and the light source.

The light fixtures of the present invention may be utilized in any arrangement. For example, at least one embodiment of the present invention is a suspended or overhead light fixture. In such an embodiment, the light fixture may have one or more suspension mechanisms such as suspension rods, cables, or flanges. In another embodiment of the present invention, the light fixture is a wall-mounted light fixture. In such an embodiment, the light fixture may be mounted horizontally, vertically, or in any other fashion necessary to achieve the desired aesthetic and light output. In a further embodiment, the present invention is a system which includes one or more light fixtures. In such an embodiment, the light system may include a number of similar light fixtures or different light fixtures. One or more embodiments of the present invention may be configured to be suspended, wall-mounted, or both. For example, some embodiments of the present invention may be configured to work as both an overhead suspended light fixture or as a wall-mounted light fixture, with the suspension mechanisms and other components able to accommodate either configuration. Additionally, depending on the amount of illumination desired in the lighted area and on other factors, such as visual aesthetics, the embodiments of the present invention may be installed with the optic elements or reflectors pointing towards, or away from, the lighted area. These embodiments may be better understood in view of the figures, which are described below.

FIG. 2(a) is an illustration of a suspended or overhead solid-state light source light fixture, in accordance with one embodiment of the present invention. The suspended light fixture shown in FIG. 2(a) is considered to be an extruded light fixture configuration, because the cross-sectional profile of the light fixture is substantially uniform along its horizontal axis. The term "extruded" is not intended to confine this embodiment of the present invention to any specific manufacturing process, such as an extrusion process, or to the result thereof. Instead, the extruded SPE light fixture of the present invention and its individual components may be manufactured by a number of known methods. The term "extruded" is used herein to instead refer to the configuration of the SPE light fixture which has a fixed cross-sectional profile but elongated side. Of course, other embodiments may show variations in the cross-sectional profile along the horizontal axis. As shown, the light source of the light fixture includes a plurality of emitters in an LED array 212. The LED array 212 is positioned within an angle of a triangular cross-section optic element 206 having a concave surface remote from the light source. The LED array emits light radiation downwards toward the concave surface of the optic element, upon which a wavelength-converting material 204 is deposited. The light fixture further includes two parabolic reflectors 208, which are positioned above the optic element 206 and the LED array 212. The reflectors reflect light, which has been emitted by the LED array and down-converted and back transferred towards the reflectors, to the desired environment, i.e., a lighted area. This embodiment is further detailed in FIG. 2(b), which illustrates a cross-sectional view of the solid-state light source light fixture shown in FIG. 2(a). As shown, the LED array (which is shown in this view as one LED emitter 202) emits light radiation downwards towards a wavelength-conversion material 204 which includes a down-converting material. The wavelength-conversion material 204 is deposited on a concave surface of the triangular cross-section optic element 206. A wavelength-converting material layer may also be coated on the other walls of the optics, if necessary for the particular light fixture configuration, light efficiency, and output. Some of the emitted light radiation 214 is down-converted and transferred forward, as forward transferred light 220, through the concave surface of the optic element 206. Some of the emitted light radiation 214 is down-converted and transferred rearward, as back transferred light 222, through the side walls of the optic element 206 towards the reflectors 208, where the converted light radiation is reflected. In the illustrated embodiment, reference numbers 214, 220, and 222 identify light beams, not physical elements, and are not claimed components of the invention.

The direction of light rays impinging on the reflector is desirably in the same direction as light rays that have been transmitted through the down conversion layer. Consequently, the total light output of the fixture may be a combination of light transmitted through the down-conversion material and back transferred rays. However, depending on the reflector size, geometric shape, and distance from the optical element, some back transferred rays from the wavelength-converting material may impinge on the ceiling or walls without hitting the reflector. Such upward rays would be useful for an indirect-direct type light fixture, which will result in an increased illumination of the upper space of the room.

The wavelength-converting material which is deposited on the concave surface of the optic element, in this embodiment, may be enclosed by the optic element to prevent detrimental dust accumulating which could decrease the overall light output of the fixture over time. As stated above, a wavelength-converting material is a material that absorbs radiation in one spectral region and emits radiation in another spectral region. In an exemplary embodiment, wavelength-converting material may comprise a single wavelength-converting material. In an alternative embodiment, the wavelength-converting material may comprise more than one wavelength-converting materials. Multiple wavelength-converting materials are capable of converting the wavelength emitted from the emitters to the same or different spectral regions. In exemplary or alternative embodiments, the wavelength-converting material may comprise one or more phosphors such as yttrium aluminum garnet doped with cerium (YAG:Ce), strontium sulfide doped with europium (SrS:Eu), YAG:Ce phosphor doped with europium; YAG:Ce phosphor plus cadmium selenide (CdSe) or other types of quantum dots created from other materials including lead (Pb) and silicon (Si); among others. In an alternative embodiment, the phosphor layer may comprise other phosphors, quantum dots, quantum dot crystals, quantum dot nano crystals, or other down-conversion materials. The wavelength-converting material may be a down-conversion crystal instead of powdered material mixed with a binding medium. The wavelength-converting material layer may include additional scattering particles, such as micro spheres, to improve mixing of light of different wavelengths. In an alternative embodiment, the wavelength-converting material may be comprised of multiple continuous or discrete sub-layers, each containing a different wavelength-converting material. Wavelength-converting materials may be formed by, for example, mounted, coated, deposition, stenciling, screen printing, and any other suitable technique. Wavelength-converting material may be formed partially on one wall of the optics. All of the embodiments disclosed in this application may use any of the phosphors described herein.

Additional benefits can be achieved through the use of a heat sink. The embodiment shown in FIGS. 2(a)-2(c) is a suspended or overhead light fixture, which is affixed to a surface by one or more suspension mechanisms. For example, suspension wires or rods (hollow or solid) may be used to hang the light fixture. The suspension mechanisms may also include power cords, control wires, or other aspects which are necessarily included in light fixtures. Power and control wires for the light fixture may be connected along with the suspension wires or inside the rods.

FIG. 2(c) illustrates an expanded view of FIG. 2(b) showing the heat sink 210 and the LED emitter 202. A heat sink 210 is shown to be affixed to the bottom of the LED emitter 202 which, since this embodiment is shown as a suspended or overhead light fixture, actually means that the heat sink 210 is around and above the LED emitter 202. At least a portion of the heat sink 210 is external to the enclosure created by the optic element 206. The heat sink may comprise a series of fins. The heat sink could alternatively, or additionally, include a mesh that extends from heat sink 210 and surrounds at least a portion of the outer surface of the optic element 206 between the LED emitter 202 and the concave surface of the optic element. The heat sink 210 may be manufactured of various heat dissipation materials known in the art, such as aluminum, copper, and carbon fiber. The heat sink may be painted in a color, for example painted in white, to enhance or alter the heat dissipation capability of the material. At least a portion of the heat sink 210 is external to the optic element 206, but the heat sink 210 is coupled to the internal LED emitter 202. This can be achieved, for example, at a break-through in the optic element at an end substantially opposite the concave surface of the optic element. This coupling effectively retains the LED emitter 202 substantially within the optic element 206 while also sealing the optic element 206 closed. Once assembled, the inside of the optic element 206 may be a solid, a vacuum, or may be filled with air or an inert gas.

Figure 3:
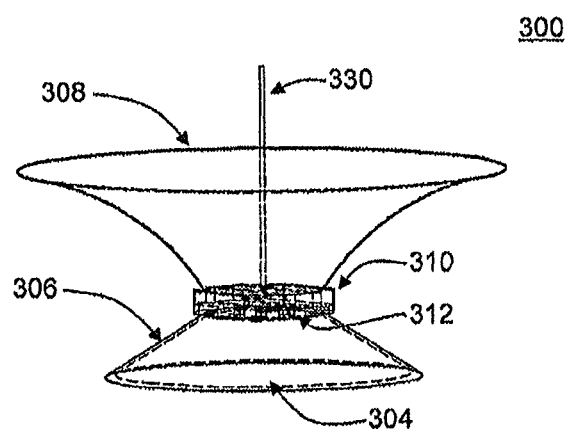
FIG. 3 is an illustration of a solid-state light source light fixture, in accordance with another embodiment of the present invention.
Figure 4A:
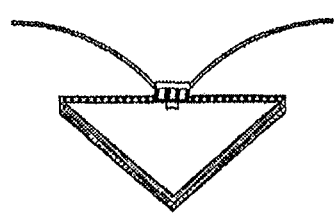
FIGS. 4(a)-4(f) illustrate cross-sectional views of other embodiments of the present invention which include one or more light sources, wave-length conversion materials, heat sinks, and optic elements.
Figure 4B:
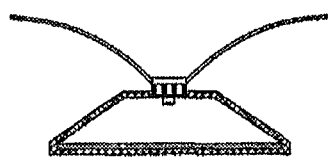
Figure 4C:
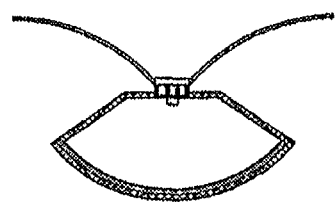
Figure 4D:
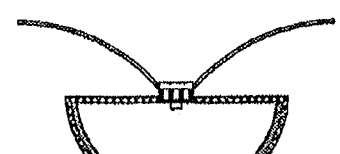
Figure 4E:
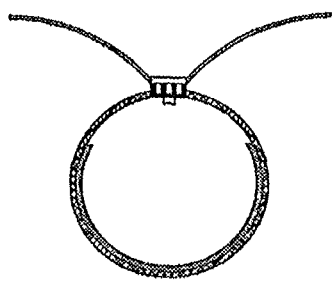
Figure 4F:
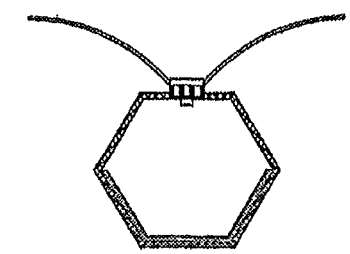
Figure 5A:
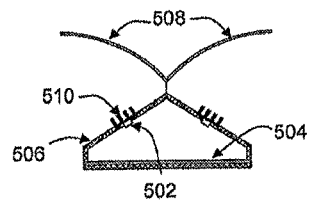
FIGS. 5(a)-5(d) illustrate cross-sectional views of other embodiments of one or more light sources, wave-length conversion materials, heat sinks, and optic elements, in accordance with other embodiments of the present invention.
Figure 5B:
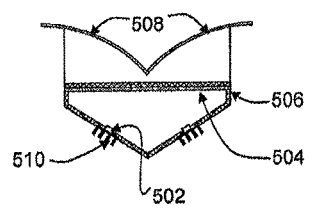
Figure 5C:
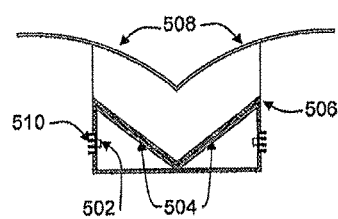
Figure 5D:
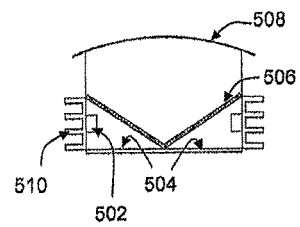

FIG. 3 is an illustration of a solid-state light source light fixture, in accordance with another embodiment of the present invention. Such a light fixture may be considered a pendant light fixture, as it is suspended by only one suspension mechanism. The pendant light fixture shown in FIG. 3 is also considered to be a revolved light fixture configuration, since the cross-sectional profile of the light fixture is substantially uniform as it is circumferentially rotated around its vertical axis. Of course, other embodiments may show variations in the cross-sectional profile as the light fixture is rotated around its vertical axis. In the embodiment shown in FIG. 3, an LED array 312 is positioned to emit light radiation downwards towards a remote wavelength-conversion material 304 which is deposited on a conical-shaped transmissive optic element 306. A conical-shaped reflector 308 is inversely affixed atop the LED array 312 and optic element 306 so as to provide an hour-glass appearance to the complete light fixture 300. A heat sink 310 is adjacent or affixed to the LED array 312 between the reflector 308 and the optic element 306. In this embodiment, the pendant-style light fixture 300 is suspended in the lighting location by a singular suspension mechanism 330. The heat sink 310 may be used to mechanically support the radiation emitting light source, an LED array 312 in this embodiment, and utilized for heat dissipation purposes.

FIGS. 4(*a*)-4(*f*) illustrate cross-sectional views of various light fixture configurations featuring one or more light sources, wave-length conversion materials, heat sinks, optic elements, and reflectors, in accordance with other embodiments of the present invention. As shown, the light source may be one light emitter positioned between the reflectors and the optic elements. FIG. 4(*a*) shows an embodiment in which one light emitter is used to direct light towards a wavelength-conversion material deposited on, or integrated with, a triangular-shaped optic element. FIGS. 4(*a*) and 4(*f*) show embodiments of the present invention in which the wavelength-conversion material may be deposited on, or integrated with, one or more surfaces of the optic element. As discussed above and shown in FIGS. 4(*a*)-4(*f*), the optic element may take a number of other shapes. In each of the light fixture embodiments shown in FIGS. 4(*a*)-4(*f*), some light radiation emitted by the light source may be reflected back towards the light source as unconverted light radiation. The converted light may be forward transferred or back transferred. Additionally, some light may be transferred through the wavelength-conversion material without being converted (i.e., unconverted transmitted radiation). By capturing both the forward transferred portion and the back transferred portion of the down-converted light, system efficiency may be improved. Similarly, the position of the down-conversion material and the reflector, when one or more reflectors are utilized, may be adjusted to ensure that light from the light source impinges the down-conversion material uniformly to produce a uniform white light and allowing more of the light to exit the device. At the same time, positioning the down-conversion material remote from the light source prevents light feedback back into the light source. As a result, the heat at the light source is further minimized and results in improved light output and life. The shape of the optic element and the reflectors, as well as the position and number of light emitters, can be configured in any way to achieve increased light production, enhanced lighting efficiency, and improved energy utilization in comparison to known technologies.

FIGS. 5(*a*)-5(*c*) illustrate cross-sectional views of various light fixture configurations featuring one or more light sources, wave-length conversion materials, heat sinks, optic elements, and reflectors, in accordance with other embodiments of the present invention. As shown, a number of light sources may be used. For example, FIGS. 5(*a*)-5(*d*) show embodiments having multiple light emitters 502 each. FIG. 5(*a*) shows an embodiment in which two light emitters 502 are used to direct light towards a wavelength-conversion material deposited on, or integrated with, a pentagonal-shaped optic element. The light emitters 502 are affixed to heat sinks 510. The light emitters 502 are positioned on one or more surfaces of the optic element 506 that are substantially opposite of the surface of the optic element on which the wavelength-conversion material 504 is deposited. In this configuration, the light emitters 502 are positioned between the wavelength-conversion material 504 and the reflectors 508. The light emitters 502 emit light radiation towards the wavelength-conversion material 504, where at least some light radiation is converted and back-transferred in the direction of the light emitters. The reflectors 508 are positioned to reflect at least a portion of the back-transferred converted light radiation to the desired environment, i.e., a lighted area. In the configuration shown in FIG. 5(*a*), it is the back-transferred converted light radiation that is reflected by the reflectors and used, in addition to the forward transferred converted light radiation, to illuminate the desired area.

The pentagonal-shaped optic element shown in FIG. 5(*a*) is inverted in FIG. 5(*b*). FIGS. 5(*c*) and 5(*d*) show further configurations of the light fixture in accordance with at least one embodiment of the present invention. The optic elements shown in FIGS. 5(*c*) and 5(*d*) may also be considered pentagonal-shaped optic elements, but with an internally depressed triangular profile instead of an externally pointed triangular profile. In each of the light fixture embodiments shown in FIGS. 5(*a*)-5(*d*), multiple light emitters 502 are used, which are each affixed with a heat sink 510. FIG. 5(*b*) shows an embodiment in which the wavelength-conversion material 504 is deposited on, or integrated with, one surface of the optic element 506, while FIG. 5(*c*) shows an embodiment in which the wavelength-conversion material 504 is deposited on, or integrated with, multiple surfaces of the optic element 506. In the embodiment shown in FIG. 5(*d*), the wavelength-conversion material 504 is deposited on a single surface of the optic element 506 that is perpendicular to the surfaces having the light emitters 502. In the embodiments shown in FIGS. 5(*a*)-5(*d*), some light radiation emitted by the light emitters 502 may be reflected back towards the light source as unconverted light radiation. The converted light may be forward transferred or back transferred. Additionally, some light may be transferred through the wavelength-conversion material without being converted (i.e., unconverted transmitted radiation). In the embodiments shown in FIGS. 5(*b*) and 5(*c*), the wavelength-conversion material is deposited on one or more surfaces of the optic element which are between the light source and the reflectors. In such embodiments, the reflectors capture and reflect the forward transferred portion of the down-converted light radiation. The back-transferred portion of the down-converted light radiation is allowed to pass through the transmissive surfaces of the optic element. By capturing both the forward transferred portion and the back transferred portion of the down-converted light, system efficiency may be improved. As above, the shape of the optic element and the reflectors, as well as the position and number of light emitters, can be configured in any way to achieve increased light production, enhanced lighting efficiency, and improved energy utilization in comparison to known technologies.

Figure 6A:
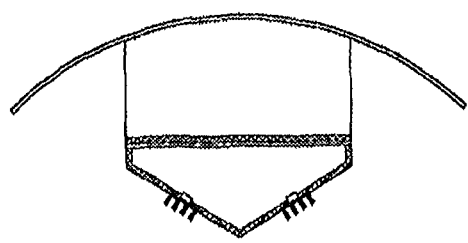
FIGS. 6(a)-6(c) illustrate a cross-sectional view of one or more light sources, wave-length conversion materials, heat sinks, and optic elements, when combined with a reflector, in accordance with other embodiments of the present invention.
Figure 6B:
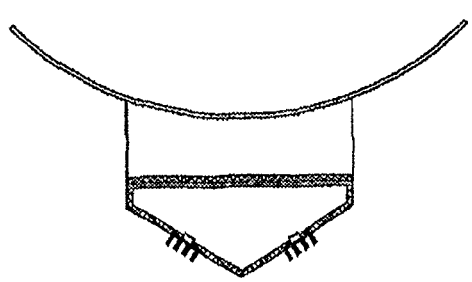
Figure 6C:
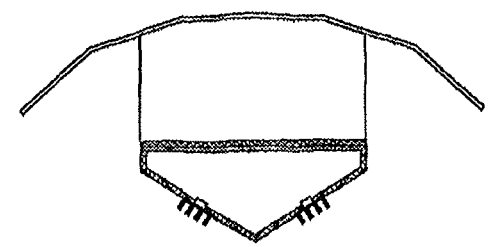

The light fixtures of the present invention may incorporate one or more reflectors having a myriad of shapes and sizes. FIGS. 6(a)-6(c) illustrate cross-sectional views of various light fixtures having reflectors of different shapes, in accordance with other embodiments of the present invention. Such reflectors may be used with both extruded-style light fixtures, as shown for example in FIG. 2(a) and in FIGS. 6(a)-6(c), and with revolved-style light fixtures, as shown in FIG. 3. In addition to extruded or revolved fixtures, the optic element of the SPE light fixtures of the present invention may have a number of sides. For example, the optic element may have a square, rectangular, trapezoidal, pentagonal, hexagonal, or octagonal shape, among other structural shapes. Optic elements having any of these structural shapes may be incorporated into any of the embodiments of the present invention.

FIGS. 7(a) and 7(b) illustrate another exemplary embodiment of the invention using the SPE technique which feature an array of emitters 712. FIGS. 7(a) and 7(b) illustrate the embodiments when used as a wall sconce and as a suspended pendant fixture, respectively. Here, the wall or ceiling to which the light fixture is mounted may behave as a reflector. FIG. 7(c) shows the cross-sectional view for both embodiments. As shown, the SPE light fixture includes optic element 706 deposited with a layer of wavelength-converting material 704. A reflector 708 having a high amount of transmissiveness (i.e., a low reflective coating), such as a translucent cover, may be used to control the output spectrum of the light fixture as well as provide desired aesthetics. FIG. 7(d) illustrates an expanded view of FIG. 7(c) showing the heat sink, optic elements, and the solid-state light emitting diode (LED). An LED or an LED array may be mounted on a heat sink. A mechanical part or suspension mechanism may be used to support the heat sink and affix the light fixture to the wall or ceiling.

Figure 8A:
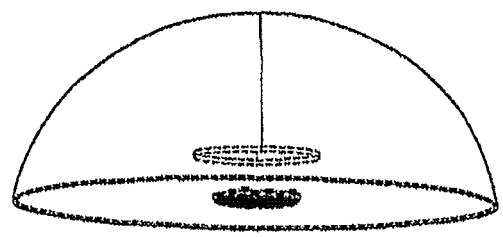
FIG. 8(a) illustrates a lighting fixture according to another embodiment of the present invention.
Figure 8B:
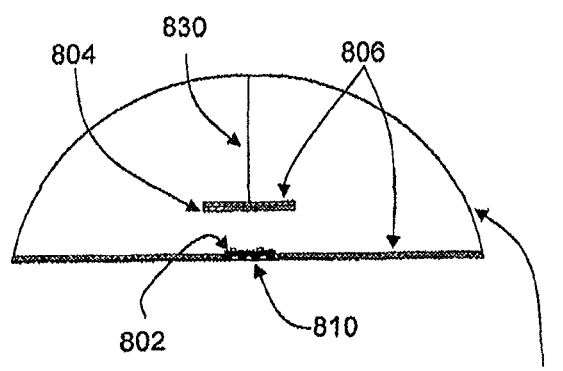
FIG. 8(b) illustrates a cross-sectional view of the lighting fixture shown in FIG. 8(a), according to an embodiment of the present invention.
Figure 8C:
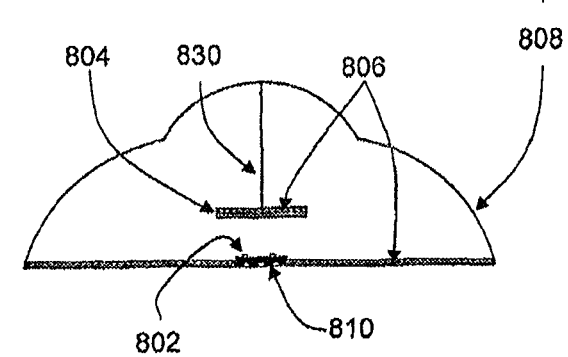
FIG. 8(c) illustrates a variation on the lighting fixture shown in FIGS. 8(a) and 8(b) which employs a compound reflector, according to another embodiment of the present invention.

FIG. 8(a) illustrates yet another exemplary embodiment of the invention using the SPE technique. It illustrates another high efficiency lighting fixture that uses solid-state light emitter(s) and a remote wavelength-converting material. FIG. 8(b) is the sectional-view of the fixture in FIG. 8(a). As shown, the fixture includes a wavelength-converting material 804 that is remote from light radiation emitter(s) 802. Both the emitter(s) 802 and the wavelength-converting material 804 are affixed to, or integrated with, optic elements 806. The wavelength-converting material 804 may be a phosphor. A reflector 808 may be used to control the output beam distribution and to improve the color uniformity the beam. Heat sink 810 may be used for mounting the emitter(s) 802 and for heat dissipation, as discussed above. A suspension mechanism 830 is used to suspend the wavelength-converting material 804 above the emitter(s) 802 within the enclosure created by the optic elements 806. The suspension mechanism 830 may also be used to mount the SPE light fixture to the wall or ceiling. For a number of reasons, including improved beam control, light efficiency, and aesthetics, multiple reflectors may be used separately or together as compound reflective surfaces. FIG. 8(c) illustrates a cross-sectional view of an embodiment incorporating a compound reflector 808. Typical applications for the SPE light fixtures shown in FIGS. 8(a)-8(c) are recessed, pendant, and track down-light fixtures.

Figure 9A:
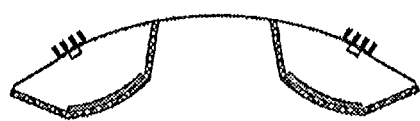
FIGS. 9(a)-9(b) illustrate lighting systems, according to another embodiment of the present invention, which employ multiple lighting fixtures.
Figure 9B:
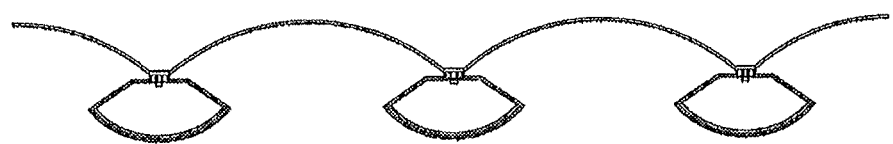

FIGS. 9(a) and 9(b) illustrate a further embodiment of the present invention which includes a number of SPE light fixtures as a SPE light system or assembly. A SPE light system may be composed of a one or more SPE light fixtures, such as those shown in FIGS. 2-8. The SPE light fixture within this SPE light system may be same or different. The individual SPE light fixtures may be connected via optic elements, reflectors, heat sinks, suspension mechanisms, or via other known components, as would be appreciated by one having ordinary skill in the art.

The amount of heat from the LED light source and other necessary electronic elements going into the light fixture limits the total capacity of the LEDs that can be used with reliable performance and, therefore, limits the amount of light that is produced. Embodiments of the present invention place the LED source and heat sink in a manner to dissipate more of the heat produced by the LEDs into the environment. This arrangement enables a greater amount of light to be produced while ensuring that the proper operating temperatures for the LEDs and electronic elements are maintained. This arrangement may be even more beneficial for applications where the SPE light fixture is used in open luminaires, when compared to benefits achieved in completely enclosed luminaires.

As stated before, the radiant energy hitting the down conversion material will be converted to a higher wavelength radiation and when mixed it will provide white light similar to the light produced by traditional light fixtures. The spectrum of the final light output depends on the wavelength-conversion material. The total light extraction depends on the amount of light reaching the wavelength-conversion layer, the thickness of the wavelength-conversion layer, and the materials and design of the optic elements and reflectors. These components can be shaped and sized in any manned contemplated to achieve the performance and aesthetic goals of the SPE light fixture. The Example and Table below detail efficiency and light radiation improvements enabled by the SPE light fixtures of the present invention.

EXAMPLE

In at least one embodiment of the present invention, an LED package with SPE technique is implemented. Unlike a typical conventional white LED package, where the down conversion phosphor is spread around the light source or die, in the SPE package of the invention the phosphor layer is moved away from the die, leaving a transparent medium between the die and the phosphor. An efficient geometrical shape for such packages may be determined via ray tracing analysis. It is worth noting that the SPE package requires a different phosphor density to create white light with chromaticity coordinates similar to the conventional white LED package. This difference is a result of the SPE package mixing transmitted and back-reflected light with dissimilar spectra, whereas the conventional package uses predominantly the transmitted light.

Figure 10A:
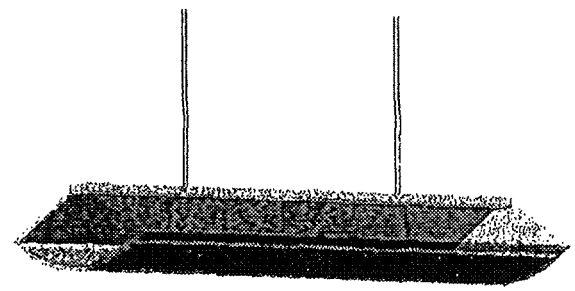
FIG. 10(a) illustrates a lighting fixture similar to that shown in FIG. 2(a) but without reflectors.
Figure 10B:
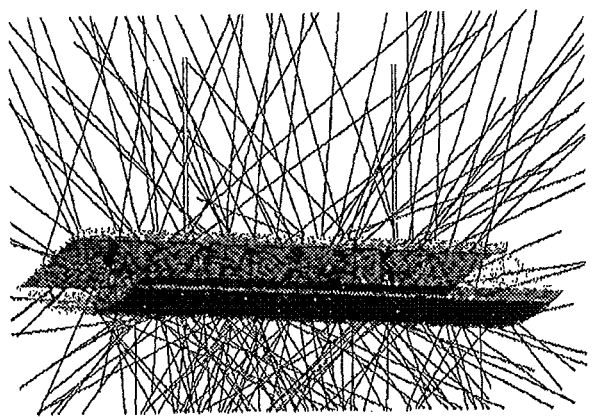
FIG. 10(b) illustrates the results of a ray tracing computer simulation showing the light output of the lighting fixture shown in FIG. 10(a).

Computer simulations were conducted to determine the light output improvement using a SPE light fixture according to the embodiments of the present invention. A light fixture model shown in FIG. 10(a) was setup in a ray-tracing software. The light fixture model shown in FIG. 10(a) is similar to that shown in FIG. 2(a), without one or more reflectors. For clarity, the configuration of the analyzed light fixture will be detailed with reference to FIG. 2(a). The blue LED array 212 was enclosed by a clear optic element 206. A phosphor wavelength-converting material 204 was attached or deposited onto the concave surface at the bottom of the optic element 206. The phosphor density was selected to achieve 6500 kelvin correlated color temperature (CCT) on the black-body locus of the 1931 CIE diagram.

FIG. 16 illustrates a few traced rays of the model. Another light fixture was modeled by changing the blue LEDs to same number of white LEDs. The phosphor layer was changed to a diffuser with the same dimensions. The white LEDs consist of the blue LED dies and phosphor spread around the blue LED dies. The radiant energies and emitting beam angles are the same from the blue LED dies in the white LEDs and from the blue LEDs used in the SPE light fixture. The CCT values and the chromaticity coordinates are the same in the white LEDs and in the SPE light fixture. Table 1 below shows the results of this comparative analysis:

TABLE 1

Results of comparative analysis.

|  | CCT | CIE (x, y) | Luminous flux (lm) |
|---|---|---|---|
| SPE fixture | 6300K | (0.316, 0.333) | 541.3 |
| White-LED fixture | 6293K | (0.315, 0.334) | 416.2 |

As shown in Table 1 above, the simulations demonstrated that the SPE light fixture has about 30% more light than the fixture using white LEDs when the CCT and the chromaticity coordinates are the same in both configurations.

Accordingly the present invention relates to a highly efficient SPE-based lighting fixture that includes solid-state radiation emitters (e.g., LEDs), a wavelength-converting material (e.g., a phosphor), and a reflector. The wavelength-converting material is placed away from the LEDs. The back transferred photons from the wavelength-converting material can be extracted to increase the overall efficiency of the fixture. Therefore, the fixture requires fewer LEDs or less electrical energy, and can cost less to manufacture.

It will be understood that the geometry of the SPE light fixtures of the present invention is not limited to the specific shapes shown in the Figures, described above, or presented in the Examples. Alternate shapes may be used to achieve specific performance or aesthetics, while addressing other design concerns, such as light color and light source life. Although the invention has been described with reference to exemplary embodiments, it is not limited thereto. Rather, the appended claims should be construed to include other variants and embodiments of the invention which may be made by those skilled in the art without departing from the true spirit and scope of the present invention.

What is claimed:

1. A light fixture comprising:
a heat sink;
an optic element made of a light transmissive material and having a first surface and a second surface which is not coplanar to the first surface, wherein the first surface and the second surface are inclined against the heat sink;
a light source connected to the heat sink and not directly connected to the optic element;
a reflector arranged above the light source, the heat sink, and the optic element; and
a wavelength-conversion material arranged between the light source and the reflector.

2. The light fixture of claim 1, wherein the heat sink has a portion exposed to air.

3. The light fixture of claim 1, wherein the light fixture is a wall-mounted fixture or a suspended fixture.

4. The light fixture of claim 1, wherein the light source is remote from the wavelength-conversion material.

5. The light fixture of claim 1, wherein the optic element has a cross-sectional shape selected from the group consisting of circular, triangular, hexagonal, trapezoidal, semicircular, and elliptical.

6. The light fixture of claim 1, wherein the light source is able to be driven by direct current or alternating current.

7. The light fixture of claim 1, wherein the reflector comprises a parabolic reflective surface.

8. The light fixture of claim 1, wherein the optic element comprises a break between the first surface and the second surface for structurally connecting to the heat sink.

9. The light fixture of claim 1, wherein the first surface and the second surface are oriented to face the reflector.

10. The light fixture of claim 1, wherein the optic element has a third surface on which the wavelength-conversion material is disposed.

11. The light fixture of claim 10, wherein the third surface is inclined against the first surface.

12. The light fixture of claim 1, wherein the heat sink comprises a mesh extending from the heat sink to affix the optic element.

13. The light fixture of claim 1, wherein the heat sink comprises a series of fins.

* * * * *